United States Patent [19]

Keller et al.

[11] Patent Number: 4,496,332

[45] Date of Patent: Jan. 29, 1985

[54] ROTARY VIBRATION ISOLATOR BUSHING

[75] Inventors: Frederick P. Keller, Grand Rapids; Theodore C. Zwiep, Holland, both of Mich.

[73] Assignee: Cascade Engineering, Inc., Grand Rapids, Mich.

[21] Appl. No.: 352,307

[22] Filed: Feb. 25, 1982

[51] Int. Cl.³ .......................... F16D 3/72; F16D 3/76
[52] U.S. Cl. .................................. 464/89; 464/180; 464/182
[58] Field of Search .................. 464/89, 87, 180, 181, 464/178, 75, 182; 415/119, 122 R, 170 R, 173 R; 384/220, 222; 416/244 A, 500

[56] References Cited

U.S. PATENT DOCUMENTS

| | | | |
|---|---|---|---|
| 2,558,589 | 6/1951 | Skolfield | 29/450 |
| 2,628,771 | 2/1953 | Uhlrig | 416/114 R |
| 2,830,445 | 4/1958 | Kressin | 464/87 |
| 2,870,616 | 1/1959 | Benson | 464/182 X |
| 2,900,809 | 8/1959 | Crankshaw | 464/89 |
| 3,068,664 | 12/1962 | Guilbert | 464/89 |
| 3,304,747 | 2/1967 | Elenburg | 464/89 |
| 3,545,232 | 12/1970 | Neese et al. | 464/11 X |
| 4,040,690 | 8/1977 | Finney | 384/221 |
| 4,105,266 | 8/1978 | Finney | 384/221 |
| 4,178,811 | 12/1979 | Shepherd | 464/89 X |
| 4,191,030 | 3/1980 | Calistrat | 464/89 |
| 4,322,062 | 3/1982 | Aleck | 464/89 X |

FOREIGN PATENT DOCUMENTS 2909083  9/1979  Fed. Rep. of Germany ........ 464/89

Primary Examiner—John M. Jillions
Assistant Examiner—Daniel P. Stodola
Attorney, Agent, or Firm—Varnum, Riddering, Schmidt & Howlett

[57] ABSTRACT

In a rotary fan (10) having a tubular drive shaft (14) and a lower cylindrical hub (16), an isolator bushing (20) interconnects the drive shaft (14) and hub (16) so as to substantially reduce vibrations. The bushing (20) is elastomeric, tapered and mounted within the hub (16) in an uncompressed state to maintain vibration-reducing properties. The drive shaft (14) extends into and terminates within a central bore (42) of the bushing (20), and the end portion of the shaft (14) is secured at a lower portion of the bushing (20). The hub (16) is secured to an upper end surface of the bushing (20) and the length of the bushing (20) provides dampening of vibrations caused by rotary motion. The tapering of the bushing (20), while maintained in an uncompressed state, provides dampening of vibrations caused by resonant frequency characteristics.

10 Claims, 4 Drawing Figures

ROTARY VIBRATION ISOLATOR BUSHING

DESCRIPTION

1. Technical Field

The invention relates to a vibration isolator bushing mounted between the drive shaft of a motor and the hub of a rotary device such as a fan.

2. Background Art

In rotary fans it is common to mount a rubber or similar elastomeric bushing between the drive shaft of the fan motor and the hub on which the fan blades are supported. In such a conventional fan the bushing serves to damp vibrations generated during rotation of the drive shaft so as to reduce noise during operation of the fan. The rubber bushing also can connect the drive shaft to the rotary hub which supports the fan blades. This connection may be in addition to or in place of a set screw or other clamping means which connects the drive shaft to the hub. The bushing dampens the transmission of vibrations from the motor to the blades as well as prevents oscillation of the motor shaft which could cause annoying noise if the shaft were to hit another portion of the hub assembly.

One such example of a mounting for a rotary hub which supports fan blades is disclosed in U.S. Pat. No. 2,558,589, to Skofield issued June 26, 1951. In the Skofield U.S. Pat. No. 2,558,589 a cylindrical, elastomeric bushing, preferably made of rubber, is mounted between the drive shaft of a motor and the rotary hub of the fan. The hub includes a bore which receives the bushing in a compression fit. In this regard, the inside diameter of the bore through the hub is less than or equal to the outside diameter of the bushing. In this way, the bushing is compressed when mounted in the hub. The bushing includes a bead which is received in a groove in the drive shaft so as to lock the bushing and drive shaft together. The bushing prevents the transmission and amplification of vibrations between the motor and fan so as to reduce noise.

The conventional bushing mount is formed of an elastomeric material such as rubber which is mounted in a compressed state. When compressed, the rubber loses a portion of its elasticity and does not have the resiliency necessary to damp vibrations of the drive shaft and prevent the transmission of such vibrations from the shaft to the hub. Further, a rubber or similar elastomeric bushing does not provide the rigidity needed to connect the drive shaft of the motor to the hub. A conventional rubber bushing which is mounted in the compressed state also allows for angular movement or "wobble" of the drive shaft which causes wear and tear on the motor and hub as well as generates noise. Further, rubber is a less stable material as compared to modern synthetic elastomeric materials and deteriorates in the presence of oils or the like. The lack of resiliency of the rubber when compressed reduces its capability to damp vibrations of the shaft and hub and prevent transmission of the vibrations. Further, the need to mount the bushing in a compressed state requires special tools needed to compress the bushing between the drive shaft and the fan hub.

DISCLOSURE OF INVENTION

In accordance with the invention it has been found that vibrations in the shaft and hub of a rotary device having a cylindrical hub and a rotary drive shaft coaxially mounted within the hub can be dampened by mounting a bushing between the hub and shaft in a substantially uncompressed state, which bushing also serves to operatively connect the drive shaft and hub. The bushing has first and second end surfaces having central apertures therein and a central bore extending therethrough which receives the drive shaft in a close-fitting relationship. The end of the drive shaft is spaced from the second end surface of the bushing so that the drive shaft does not extend all the way through the bushing. The bushing is fastened between the shaft and the hub and has selected elastomeric properties which provide for dampening of vibrations in the shaft and hub. It has been found that the use of such a bushing provides effective dampening of vibrations generated during rotation of the hub and shaft as well as provides a connection between the shaft and hub for rotation together.

The bushing is secured to the shaft by a set screw and is further secured to the hub by suitable fasteners. In order to accomplish this attachment, the bushing is provided with an annular plate which receives the fasteners. The bushing also includes an annular collar which is embedded within an enlarged annulus in the central bore of the bushing so that the wall of the bore and the inner wall of the collar are flush. The collar includes a threaded bore which receives the set screw so as to connect the set screw to the collar and the drive shaft.

In practice, the bushing has a slightly conical configuration having a wall thickness which tapers from the second end surface to the first end surface, which variation of wall thickness provides the desired dampening characteristics. Further, the shaft is preferably a hollow member and the rotary device includes a stationary axis which extends therethrough so that the shaft and attached hub rotate about the axis. In this configuration the bushing includes a bearing member which supports the stationary axis against angular movement. The bearing is preferably an annular disc which is embedded in the second end surface of the bushing.

The bushing is preferably formed from a 70-durometer polyurethane while the bearing member embedded therein is harder than the remainder of the bushing and is preferably formed from a 75-durometer polyurethane and impregnated with a highly lubricitive material such as molybdenum disulfide. The durometer of the polyurethane is selected so as to provide the desired dampening of vibrations in the shaft and hub as well as provide a connection between the drive shaft and hub.

BRIEF DESCRIPTION OF THE DRAWINGS

The invention will be described with reference to the accompanying drawings where like members bear like reference numerals in which.

BEST MODE FOR CARRYING OUT THE INVENTION

Figure 1:
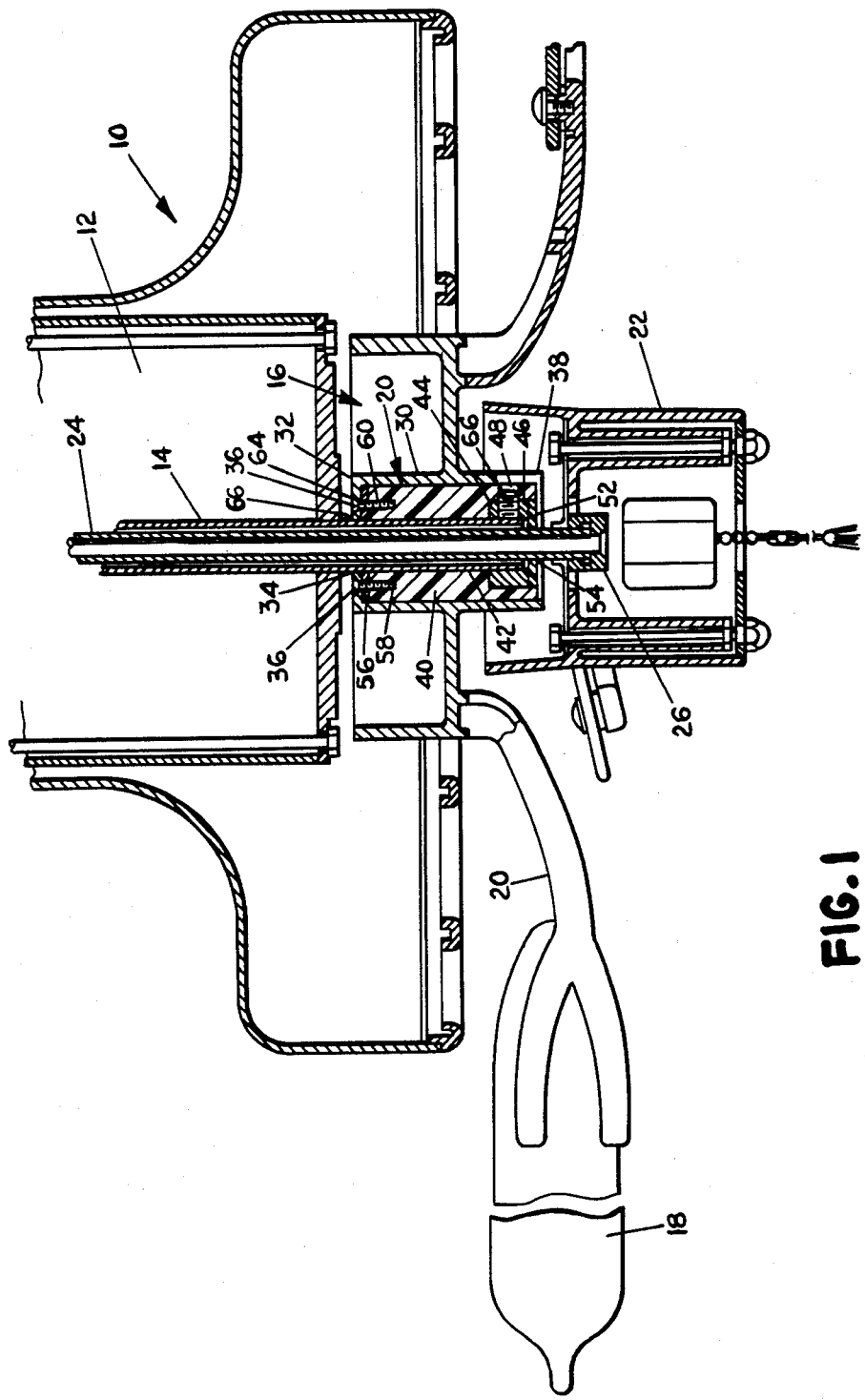
FIG. 1 is a cross-sectional view of a fan hub assembly including a vibration isolator bushing in accordance with the invention.

The hub portion of a ceiling fan is shown in FIG. 1. The remainder of the fan is not shown but it is understood that it is conventional in nature and includes a mounting plate for securing the fan to, for example, a ceiling, a decorative shroud or casing disposed over the fan motor and fan blades.

The fan 10 includes a conventional electric motor 12 having a tubular drive shaft 14 extending therefrom. The drive shaft 14 is preferably a hollow tube. The drive shaft 14 is connected to a fan hub 16 which supports a plurality of fan blades 18, one of which is illustrated. The fan blades 18 are secured to the hub 16 in a suitable fashion such as by riveting or the like.

Disposed between the hub 16 and the drive shaft 14 is a vibration isolator bushing 20 in accordance with the invention. The isolator bushing 20 serves as a means to connect the drive shaft 14 to the hub 16 so as to rotate the fan blades when the motor is operated as well as a means to damp vibrations and eliminate noise during operation of the fan 10.

The fan 10 includes a switch housing 22 which contains appropriate electrical circuitry and switches for turning the fan on and off and operating the fan at varying speeds. The switch housing 22 and its circuitry are conventional in nature and do not form a part of this invention. Extending through the hub 16 is a hollow center tube 24 having one end secured in the switch housing 22 by a retainer nut 26 and the other end (not shown) fixed in the fan motor 12 or mounting plate. The center tube 24 provides an axis about which the drive shaft 14 and hub rotate 16. The center tube 24 is fixed against rotation and supports the switch housing 22.

The hub 16 has a cylindrical wall 30 and an end wall 32. The end wall 32 includes a central aperture 34 having a diameter equal to the diameter of the drive shaft 14. Spaced from the central aperture 34 are throughholes 36 which receive fastening means for securing the isolator bushing 20 within the hub 16, as will be described below. The inner dimension and configuration of the cylindrical wall 30 of the hub 16 corresponds to the size and shape of the isolator bushing 20. The wall 30 includes a cut-away portion 38 which allows for the insertion of a fastening means through the wall 30 and into the isolator bushing 20, as will be described below. There is no direct connection between the hub 16 and drive shaft 14 of the motor 12 but rather the hub and shaft 14 are connected by the isolator bushing 20.

Figure 2:
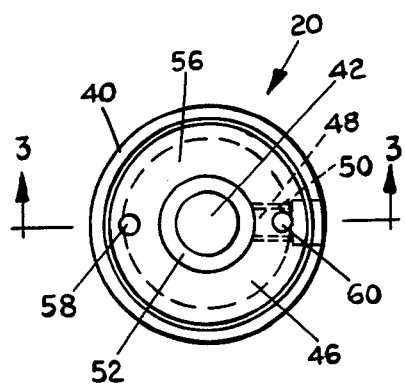
FIG. 2 is a top view of the isolator bushing of FIG. 1.
Figure 3:
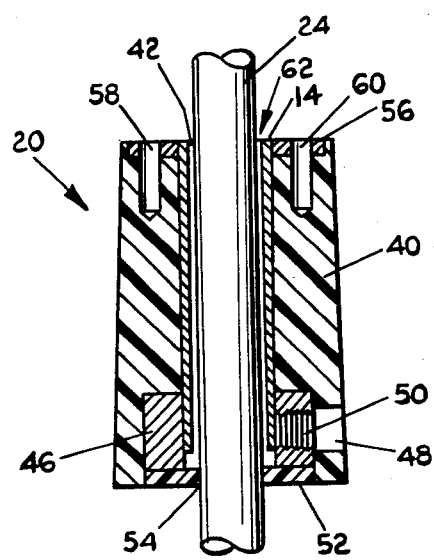
FIG. 3 is a cross-sectional view taken along lines 3—3 of FIG. 2.
Figure 4:
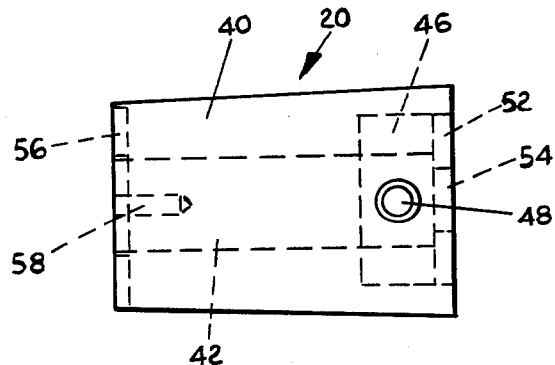
FIG. 4 is a side view of the isolator bushing in accordance with the invention.

With reference to FIGS. 2–4, the isolator bushing 20 is a slightly-tapering conical member having an upper section 40 which is made of an elastomeric material. The upper section 40 includes a central bore 42 therethrough which receives the drive shaft 14. The lower portion of the central bore 42 includes an inner annulus 44 which receives a metal collar 46, preferably formed from steel. The metal collar 46 is preferably bonded to the bushing 16 during forming thereof. A through-hole 48 perpendicular to the central bore 42 extends through the lower portion of the upper section 40 of the bushing 16 and through the collar 46. The portion of the through-hole 48 in the collar 46 includes a thread 50 for receiving a fastening member for securing the isolator bushing 20 to the drive shaft 14, as will be described below.

The lower portion of section 40 of the isolator bushing 20 carries a flat bearing member 52 which is embedded within the isolator bushing 20 during forming thereof. The bearing member 52 includes a central aperture 54 having a diameter slightly larger than the diameter of the center tube 24 which extends through the drive shaft 14. It can be seen that the bearing 52 supports the center tube 24 so as to prevent angular movement thereof.

The top portion of the isolator bushing 20 carries a flat annular plate 56 preferably made of steel. The plate 56 is embedded in the isolator bushing 20 during forming thereof and includes two apertures 58 and 60 which receive fastening means for securing the isolator bushing 20 within the hub 16. The plate 56 includes a central aperture 62 through which the drive shaft 14 is inserted.

The isolator bushing 20 is secured within the interior of the hub 16 by means of rivets 62 and 64. The rivets are inserted through the throughholes 36 in the end wall 32 of the hub 16 and are received in the corresponding apertures 58 and 60 in the plate 56. In this way, the isolator bushing 20 is fixed against movement within the hub 16.

The drive shaft 14 is connected to the hub 16 through the isolator bushing 20. In this regard, a set screw 66 is inserted through the through-hole 48 which extends through the bushing 20 and the collar 46. The set screw 66 is threaded into the threaded portion 50 of the through-hole 48 and is received in the lower portion of the drive shaft 14. In this way a connection between the drive shaft 14 and the hub 16 is made. Access to the through-hole 48 is provided by the cut-away portion 38 in the wall 30 of the hub 16.

The drive shaft 14 extends into the central bore 42 of the isolator bushings 20 so that its end is spaced from the bearing member 52. It can be seen that the drive shaft 14 and the center tube 24 are concentric and radially spaced apart.

The isolator bushing 20 is not compressed between the drive shaft 14 and the wall 30 of the hub 16 so that the elasticity and compressibility of the isolator bushing 20 are not reduced when it is mounted in place. There is a frictional engagement between the drive shaft 14 and the isolator bushing 20 in addition to the set screw connection both of which serve to connect the drive shaft 14 to the bushing 20 and thus to the hub 16.

The bushing 20 is preferably made of polyurethane and is substantially unstressed and uncompressed in its mounted condition. Preferably, the upper section 40 of the isolator bushing 20 has a durometer of 70 on the "A" scale. The cylindrical bearing member 52 is also preferably made of a polyurethane having a durometer of 75 on the "D" scale. The bearing member 52 is more rigid than the remaining portion of the isolator bushing 20 and does not provide any dampening properties nor serve to connect the drive shaft with the hub. The durometer of the polyurethane is selected to provide the desired dampening characteristics. In this regard, a material which is too hard would not provide enough dampening and would not absorb the vibrations generated during rotation of the drive shaft. A material which is too soft would allow for too much flexibility of the drive shaft so that it would oscillate and wobble during rotation due to the torsional vibration thereof. it is contemplated that the particular durometer of the polyurethane is selected so as to provide the desired dampening characteristics for particular motors and hub and fan blade assemblies.

The conical shape of the isolator bushing provides for a close-fitting mounting of the isolator bushing within the hub. Further, the variation of the thickness of the wall 30 of the isolator bushing due to the taper provides different dampening characteristics which will absorb different frequencies of vibration. The slight taper also allows for ease in manufacture of the bushing by providing a draft which permits the bushing, which is a molded part, to be easily removed from the mold.

The isolator bushing has enough rigidity or integrity so that it serves as a means to connect the drive shaft to the hub. In this regard, the bushing is not compressed between the drive shaft and the hub as is conventional in many bushed connections. Instead, the isolator bushing is mounted in an substantially unstressed and uncompressed state. The frictional engagement between the drive shaft and the bushing serves to connect the hub and drive shaft along with the set screw connection.

The isolator bushing dampens torsional vibrations generated during rotation of the drive shaft. The torsional vibration generates annoying motor hum and noise which is undesirable. The bushing dampens the vibration of the drive shaft so as to reduce or substantially eliminate any such vibration and resulting noise. Further, vibrations are undesirable in that they tend to cause wear on the motor and the connection between the drive shaft and hub. Dampening of these vibrations reduces the wear problem caused by gyroscopic movement of the shaft since these vibrations would not be transmitted from the shaft to the hub.

The dampening of the vibrations also serves to prevent the center tube 24 from striking the drive shaft through which it is inserted. In this regard, the center shaft is spaced from the drive shaft so as to provide an axis about which the hub and drive shaft rotate. In the past, conventional bushings would not provide enough dampening and would allow the center tube to strike the drive shaft and generate noise. The dampening of the vibrations provided by the bushing in combination with the integral bearing which supports the lower end of the center tube greatly reduces the contacting of the drive shaft and center tube which generates annoying noise and causes wear and tear on the tube and its bearing. The isolator bushing provides sufficient dampening so that the center tube can vibrate without striking the drive shaft. The polyurethane used to form the bearing 52 is preferably impregnated with a highly lubricitive material such as molybdeum disulfide which adds lubricity to the polyurethane. In this way, friction between the center tube 24 and the bearing 52 during rotation of the hub 16 is reduced.

The above-described isolator bushing provides desired dampening of torsional vibrations of the drive shaft which produce annoying noises and cause wear and tear on the shaft and hub. The isolator bushing serves to reduce this undesirable vibration which generates annoying noise. It has been found that a remarkable reduction of the noise is accomplished by use of such an isolator bushing. Further, the isolator bushing is easily installed within the hub since it is not compressed between the drive shaft and wall of the hub as in conventional elastomeric bushings.

Reasonable variation and modification are possible within the scope of the foregoing disclosure and drawings without departing from the spirit of the invention which is defined in the appended claims.

The embodiment of the invention in which an exclusive property or privilege is claimed is defined as follows:

1. In a rotary fan device including a rotatable cylindrical hub, a rotary drive shaft coaxially mounted within said hub with an annular space therebetween, and bushing means for operatively connecting said shaft with said hub for transmitting torque from said shaft to said hub and for dampening vibrations in said shaft and hub, the improvement comprising:
    a bushing constructed of elastomeric material and mounted in the annular space in a substantially uncompressed state so as to maintain vibration dampening properties of said elastomeric material;
    said bushing having first and second end surfaces each having a central aperture therein and a central bore extending therethrough between said end surfaces, said central bore having a diameter slightly larger than a diameter of said shaft;
    said shaft having an end portion terminating within said central bore and close to the second end surface;
    hub fastening means located adjacent said first end surface for rigidly connecting said first end surface of said bushing to said hub; and
    shaft fastening means for rigidly connecting said end portion of said shaft to said bushing adjacent said second end surface, wherein a substantial axial length of said bushing extends between said hub fastening means and said shaft fastening means, and said bushing is adjacent and unconnected to both said hub and said shaft along said axial length so as to provide vibration dampening of said shaft and hub.

2. The device of claim 1 wherein said shaft fastening means includes set screw means connected to said bushing and received in said end portion of said shaft for securing said bushing to said shaft.

3. The device of claim 2 wherein said hub includes an end wall adjacent said first end surface of said bushing and said hub fastening means includes:
    a rigid, annular plate secured to said first end surface; and
    fasteners securing said plate to said end wall.

4. The device of claims 2 or 3 wherein said central bore of said bushing includes an enlarged annulus for embedding an annular collar having an inner wall flush with an inner wall of said central bore, said collar including a threaded bore for threadedly receiving said set screw means.

5. The device of claim 4 wherein said bushing is formed from a 70-durometer polyurethane.

6. The device of claim 1 wherein said bushing has a slightly conical configuration having a wall thickness which tapers at a constant angle from said second end surface to said first end surface, said variation in wall thickness resulting from tapering of an outer surface of said bushing and providing for dampening of different frequency vibrations.

7. The device of claim 6 wherein said bushing is formed from a 70-durometer polyurethane.

8. The device of claims 1 or 6 wherein said shaft is a hollow member, the rotary device includes a stationary center tube which extends through said shaft so that said shaft and hub rotate about said stationary center tube, and said bushing further includes a bearing means for supporting said stationary center tube against angular movement relative to a longitudinal axis through said stationary center tube.

9. The device of claim 8 wherein said bearing means is an annular disc embedded in the second end surface of said bushing.

10. The device of claim 9 wherein said bushing is formed from a 70-durometer polyurethane and said annular disc is formed from a 75-durometer polyurethane.

* * * * *